United States Patent
Widdowson et al.

(10) Patent No.: US 11,753,955 B2
(45) Date of Patent: Sep. 12, 2023

(54) SEAL FOR A GAS TURBINE ENGINE

(71) Applicant: ROLLS-ROYCE plc, London (GB)

(72) Inventors: Tony L. Widdowson, Derby (GB); Oliver C. Taylor-Tibbott, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/822,506

(22) Filed: Aug. 26, 2022

(65) Prior Publication Data
US 2023/0066032 A1 Mar. 2, 2023

(30) Foreign Application Priority Data
Sep. 2, 2021 (GB) ...................... 2112500

(51) Int. Cl.
*F01D 11/00* (2006.01)

(52) U.S. Cl.
CPC .......... *F01D 11/005* (2013.01); *F01D 11/003* (2013.01); *F05D 2220/323* (2013.01)

(58) Field of Classification Search
CPC ............................ F01D 11/003; F01D 11/005
See application file for complete search history.

(56) References Cited

U.S. PATENT DOCUMENTS

| | | | | |
|---|---|---|---|---|
| 8,985,941 B2 * | 3/2015 | Mayes | ................... | F16J 15/022 277/648 |
| 10,145,256 B2 * | 12/2018 | Ratajac | ................... | F16J 15/065 |
| 2011/0203251 A1 * | 8/2011 | Mayes | ................... | F16J 15/022 277/645 |
| 2018/0298772 A1 * | 10/2018 | Ratajac | ................... | F16J 15/065 |

FOREIGN PATENT DOCUMENTS

| | | |
|---|---|---|
| CN | 103612747 B | 2/2016 |
| WO | 2006000781 A1 | 1/2006 |

OTHER PUBLICATIONS

Feb. 8, 2023 Search Report issued in European Patent Application No. 22188678.1.

* cited by examiner

*Primary Examiner* — Eldon T Brockman
(74) *Attorney, Agent, or Firm* — Oliff PLC

(57) ABSTRACT

A seal arrangement configured to provide an airtight and fluid-tight seal between a first component and a second component, having a first pressure boundary seal disposable at least partially within the gap between the first component and the second component, the first pressure boundary seal being fixable to one of the first or second components to create an airtight seal with the other of the first or second component, the seal arrangement also having a first flame deflector that is configured to bridge across and cover the gap between the first component and the second component so as to create a fluid-tight seal over the gap between the first component and the second component, where the first flame deflector has a convex external shape so as to prevent any fluid impinging upon the first flame deflector from pooling on the first pressure boundary seal.

12 Claims, 16 Drawing Sheets

SEAL FOR A GAS TURBINE ENGINE

CROSS-REFERENCE TO RELATED APPLICATIONS

This specification is based upon and claims the benefit of priority from United Kingdom patent application GB2112500.0 filed on Sep. 2, 2021, the entire contents of which is incorporated herein by reference.

BACKGROUND

Field of the Disclosure

The present disclosure provides a seal for air, fire, and liquid between two components of a gas turbine engine.

Description of the Related Art

Components of gas turbine engines that fit together often need to have seals therebetween to prevent fluid or air movement across the boundary. In a gas turbine engine, one example of such a region is the paneling around the engine core, where a number of panels serve as a fire zone boundary. Should a fire break out in this region, the seals between the panels need to prevent the fire from spreading, as well as preventing or limiting the air supply reaching the fire. As such, the seals must be sufficiently compressed to ensure that they create an air and fluid-tight seal between the panels, whilst being able to absorb movement between the panels during normal operation of the engine.

Conventional elastomeric fire seals are constructed from silicon rubber and fibres and are used widely on aero engines. The fibres are usually glass, ceramic, or Nomex®. This construction provides a combination of flexibility to accommodate movement between panels whilst providing a good airtight seal, and is capable of withstanding high temperatures for a sufficient period of time. However, it would still be advantageous to extend the period of time for which the seal is durable. It would also be advantageous to prevent flammable liquids from pooling in the seals, as can happen with known seal designs.

SUMMARY OF THE DISCLOSURE

According to a first aspect there is provided a seal arrangement for a gas turbine engine, the seal arrangement being configured to provide an airtight and fluid-tight seal between a first component and a second component, the seal arrangement comprising a first pressure boundary seal disposable at least partially within the gap between the first component and the second component, the first pressure boundary seal being fixable to one of the first or second components so as to create an airtight seal with the other of the first or second component, and a first flame deflector configured to bridge across and cover the first pressure boundary seal and the gap between the first component and the second component so as to create a fluid-tight seal over the gap between the first component and the second component, wherein the first flame deflector has a convex external shape so as to prevent any fluid impinging upon the first flame deflector from pooling on the first pressure boundary seal.

Such a seal arrangement has the advantage that it prevents the pooling of flammable fluids in the seal region, and allows the seal to endure against high temperatures and flames for an extended period compared to known seal arrangements of the prior art.

The seal arrangement can further comprise a second pressure boundary seal, the second pressure boundary seal being disposable at least partially within the gap between the first component and the second component, the second pressure boundary seal being fixable to the first or second component opposite the first pressure boundary seal, so as to create an airtight seal between the first component and the second component with the first pressure boundary seal when in use.

Embodiments with the second pressure boundary seal can be beneficial in situations where there is a larger range of movement possible between the two components during operation of the gas turbine engine.

The first flame deflector can be fixed to one or other of the first or second component. By being fixed to one component, and having a sliding seal with the other, the seal arrangement can better cope with movement between the two components during engine operation whilst maintaining the seal over the pressure boundary seal.

The first flame deflector can be attached to the first pressure boundary seal. Having the flame deflector and pressure boundary seal combined into a single piece makes the seal arrangement easier to install.

The first flame deflector can have a convex external curved or polygonal shape. Such shapes prevent fluid from pooling on the external surface of the flame deflector.

The seal arrangement can further comprise a second flame deflector configured to bridge across and cover the gap between the first component and the second component so as to create a fluid-tight seal over the gap between the first component and the second component and encapsulate the first pressure boundary seal.

Such an arrangement in beneficial in a situation where both sides of the seal arrangement could be subjected to high temperatures or flames.

Like the first flame deflector, the second flame deflector can be fixed to one or other of the first or second component, and/or can be attached to the first or second pressure boundary seal.

Like the first flame deflector, the second flame deflector can have a convex external curved or polygonal shape. The second flame deflector can have the same shape as or different shape to the first flame deflector.

According to a second aspect, there is provided a gas turbine engine for an aircraft, the gas turbine engine comprising a seal arrangement according to the first aspect. Such a gas turbine engine will have improved resilience to onboard fires.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
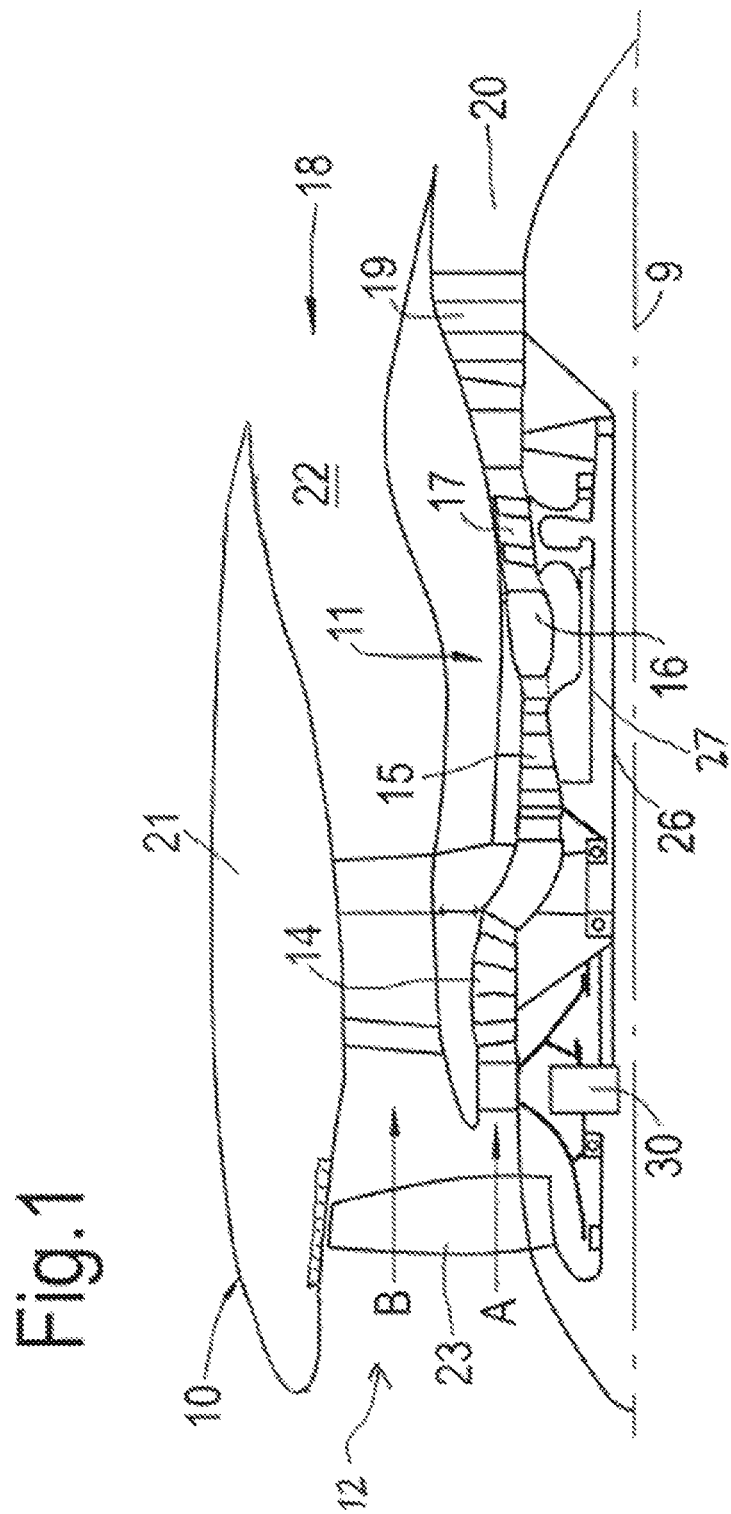
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
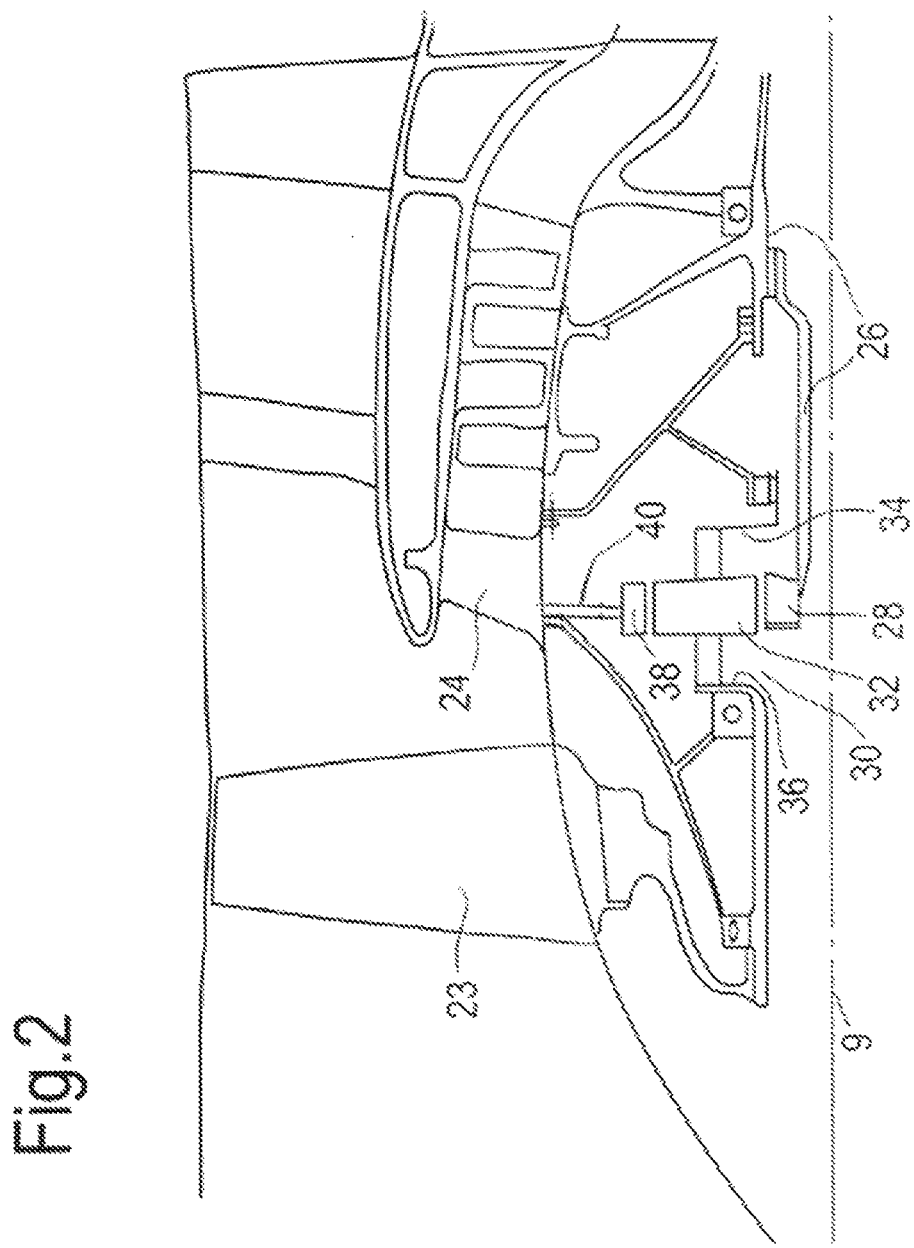
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
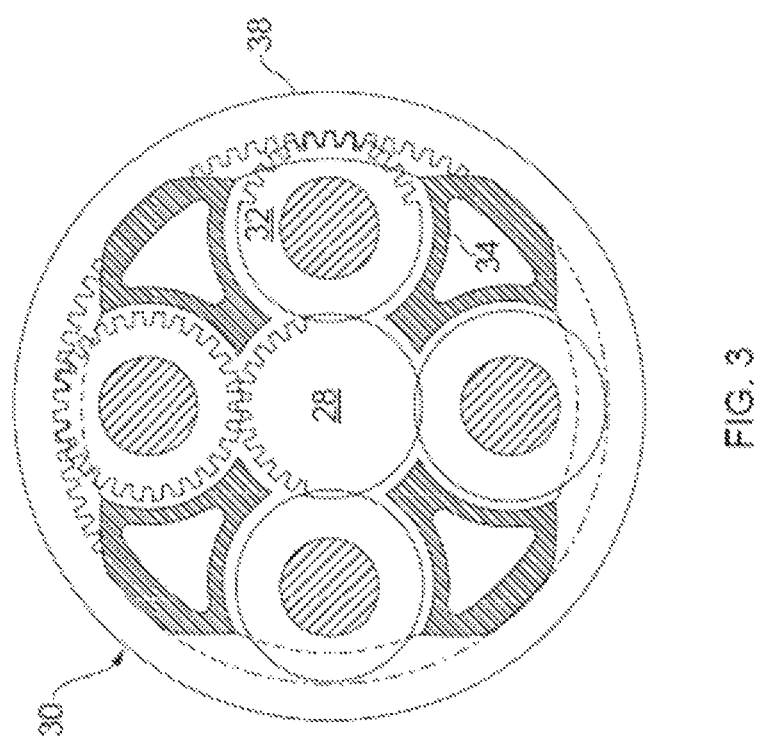
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
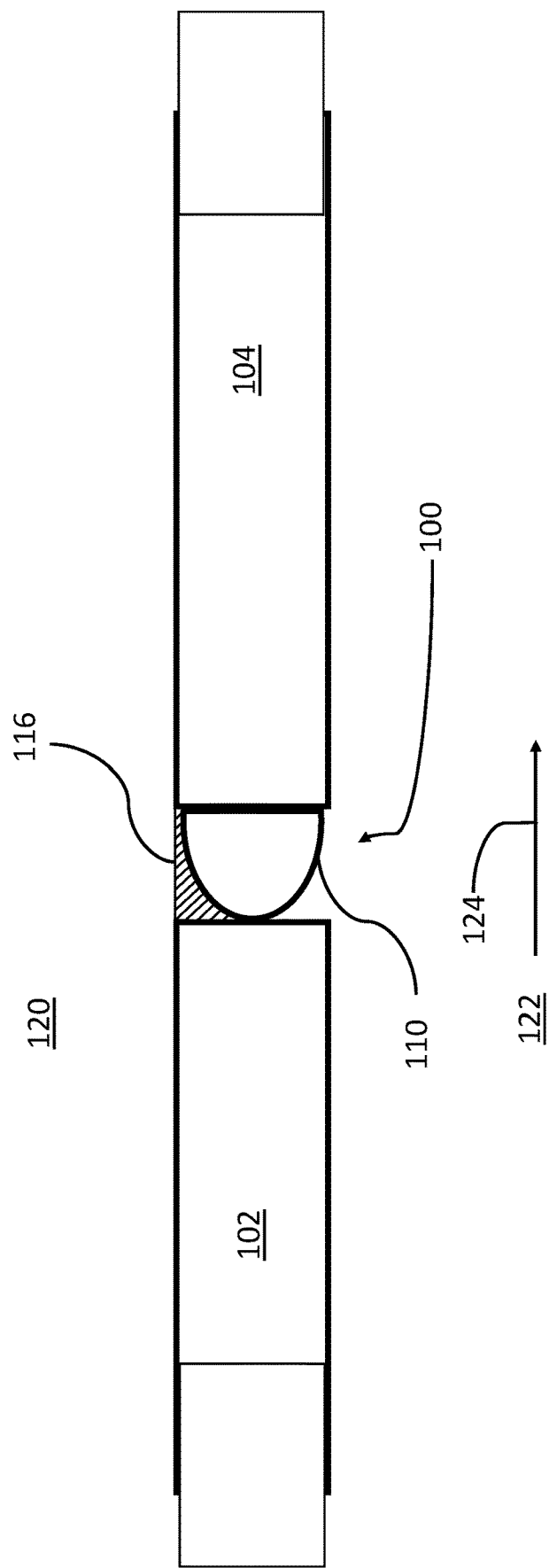
FIG. 4 is a sectional view of a sealing arrangement as known in the prior art.

FIG. 4 shows a sectional view of a known type of seal arrangement 100. The seal arrangement 100 is provided between a first component 102 (for example, a first panel) and a second component (for example, a second panel) 104, which in turn separate an interior region 120 from an exterior region 122. "Interior" and "Exterior" are here used to differentiate between the side of the seal arrangement past which air flows (referred to herein as an exterior region) and the side from which flames and or flammable liquid may impinge (referred to herein as an interior region). They are not references to any specific location within the engine, and as such it is entirely possible that both regions are inside the bounds of the engine.

The seal arrangement comprises a pressure boundary seal 110, which is positioned within the gap between the first component 102 and the second component 104. It will be appreciated that, due to the varying arrangements of panels within a gas turbine engine, the orientation of the seal arrangements shown can vary greatly. Whilst the figures have a nominal "up" and "down" direction as viewed on the page, it will be appreciated that the seal may have one orientation in one part of the engine (for example, at the top of a panel), and a different orientation in another part of the engine (for example, it may be flipped upside-down at the bottom of a panel).

Known pressure boundary seals are typically made of an elastomeric material with heat-resistant properties, such as silicone rubber. The silicone rubber may further comprise imbedded reinforcement materials, such as glass, ceramic or Nomex®, which provide the pressure boundary seal with further resistance to heat degradation. The pressure boundary seals and flame deflectors of the present disclosure would also be made from these known materials.

In use, the pressure boundary seal 110 in FIG. 4 is compressed between the first component 102 and second component 104 in order to prevent air flowing in the exterior region 122 past the first 102 and second 104 components from passing through the seal arrangement 100 to the interior region 120. In normal engine operation this seal arrangement 100 is beneficial as it reduces pressure losses inside the engine, maintaining the engine's efficiency. In emergency situations where a fire has broken out within an engine, the seal arrangement 100 provides a barrier to prevent flames from leaving the interior region bounded by the first component 102 and second component 104, and also prevents air entering from the exterior region 122 which could provide oxygen for the fire. The pressure boundary seal 110 is generally made of silicon, which provides flexibility to accommodate movement between the first and second components 102, 104 whilst also being able to withstand high temperatures for a reasonable period of time. In order to improve the temperature resistance of the seal, it is known to imbed glass, ceramic or Nomex® fabric plies into the silicon. However, this known type of seal arrangement 100 has the limitation, even with these modifications, that it cannot last forever against the extreme temperatures experienced during an engine fire. Furthermore, fluids can pool around the seal in the gap 116 between the first 102 and second 104 components. Such fluids can increase the fire risk, and therefore such pooling is to be minimised wherever possible.

In the figures of the present disclosure, the seal is shown in an essentially uncompressed state, which is to say that, whilst the gap between the first 102 and second 104 components is blocked, the seal itself has undergone little in the way of compression or deformation. As such, the fluid pooling region or gap 116 indicated in FIG. 4, and the equivalent volumes around the seal in FIGS. 5 to 15, are somewhat exaggerated for the purposes of illustrating the dislcosure. It is to be understood though that, even when the pressure boundary seal is compressed, it is still possible for grooves or indentations to be formed along the seal, or between the seal and one or other of the first 102 or second 104 component, and as such can create a region or gap where fluids can pool. It is also possible that when compressed, at least part of the seal may protrude beyond the profile of the first 102 or second 104 components, and as such may not be wholly contained within the gap between the first component 102 and second component 104, but will be disposed at least partially between the first component 102 and second component 104.

Figure 5:
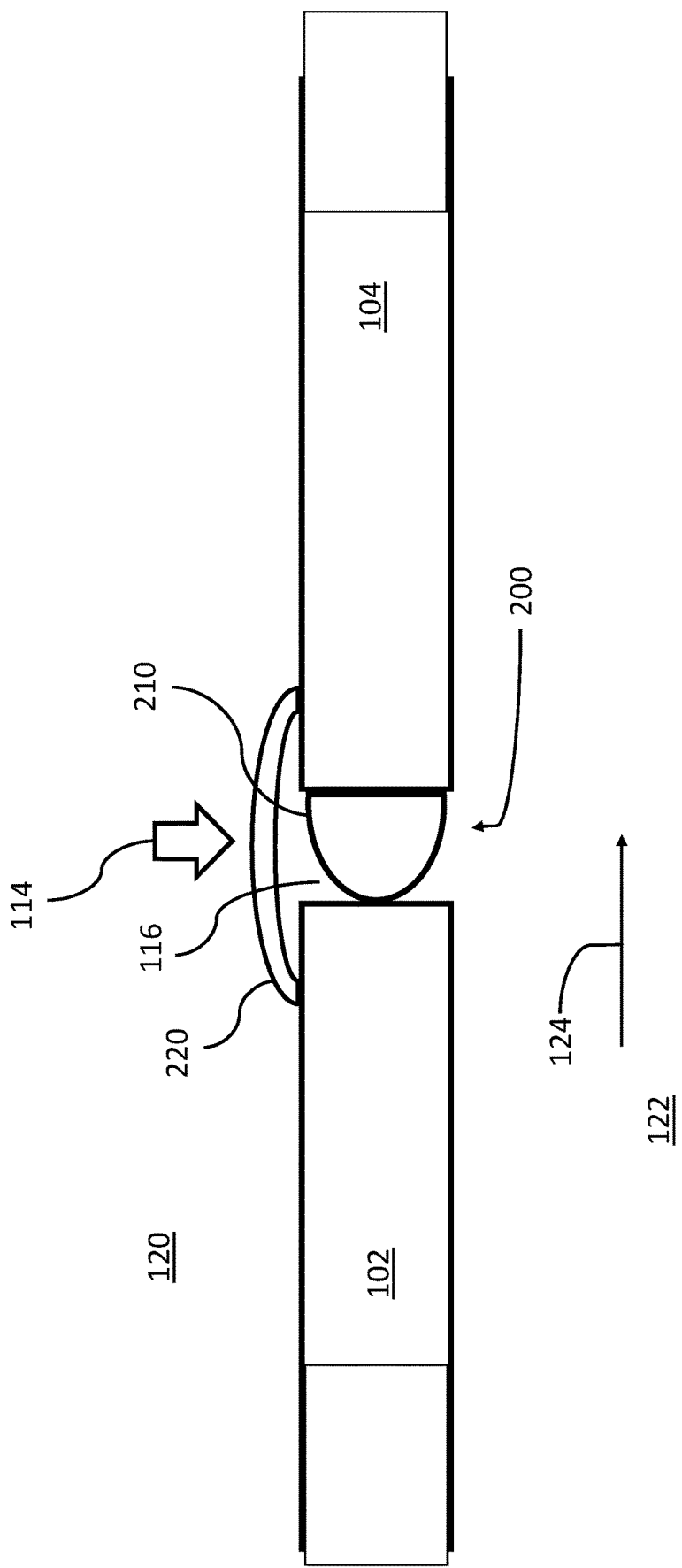
FIG. 5 is a sectional view of a first embodiment of a seal arrangement according to the present disclosure.

FIG. 5 shows a seal arrangement 200 according to a first embodiment of the present disclosure. As with the seal arrangement 100 of the prior art, there is a pressure boundary seal 210 arranged between a first 102 and second 104 components providing a barrier to airflow and fluid flow between the interior 120 and exterior 122 regions bounded by the first and second components 102, 104. However, the seal arrangement 200 has in addition a first flame deflector 220, which is situated on the same side of the first 102 and second 104 components as the potential source of flames 114. The first flame deflector 220 of the present disclosure is configured to bridge across and cover the gap where the pressure boundary seal is situated, i.e. the gap between the first component and the second component, forming a fluid-tight seal with the first 102 and second 104 components it is in contact with. The first flame deflector 220 provides two useful advantages: firstly, by covering the pressure boundary seal, the flame deflector deflects flames away from the pressure boundary seal, reducing the exposure of the seal to the heat of the flames, and increasing the amount of time the seal can prevent flames reaching the exterior of the region or air reaching the interior of the region; secondly, it prevents fluids from pooling around the seal in the gap between the first 102 and second 104 components by having an external (i.e. the surface of the flame deflector furthest from the pressure boundary seal) convex curve shape. The external convex curve shape of the fire deflector directs fluids impinging upon it away from any potential pooling points or gaps 116 around the pressure boundary seal 210.

Preferably, the first flame deflector 220 will be fixed to just one of either the first component 102 or the second component 104, and will create a sliding seal with the other component so as to provide protection to the pressure boundary seal 110 whilst accommodating normal movement between the first and second components 102, 104 during operation of the engine 10. In an arrangement where the first end second components are oriented in a plane with a vertical component, it is advantageous to fix the first flame deflector 220 to whichever of the components 102, 104 is vertically higher, so as to take advantage of gravity flowing the fluid over the deflector to the other component, minimising the possibility of fluid entering to any potential pooling points or gaps 116.

Figure 6:
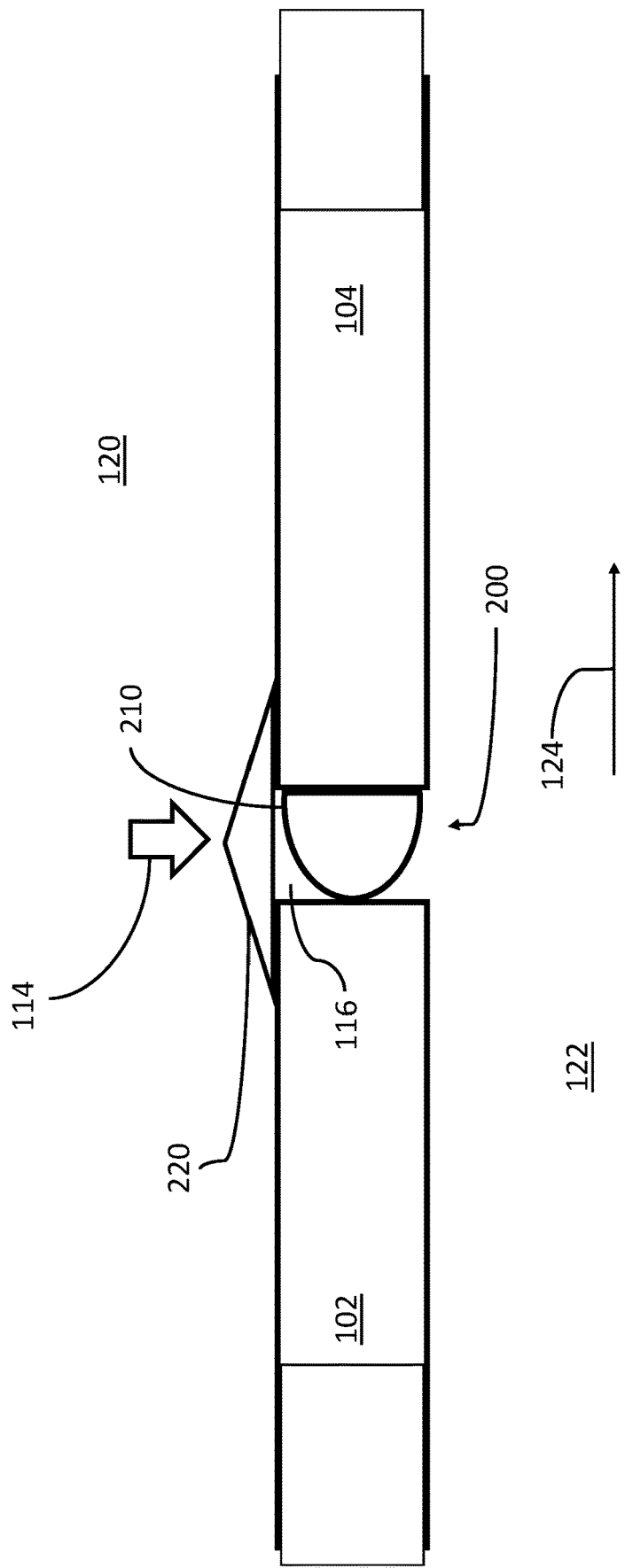
FIG. 6 is a sectional view of a second embodiment of a seal arrangement according to the present disclosure.
Figure 7:
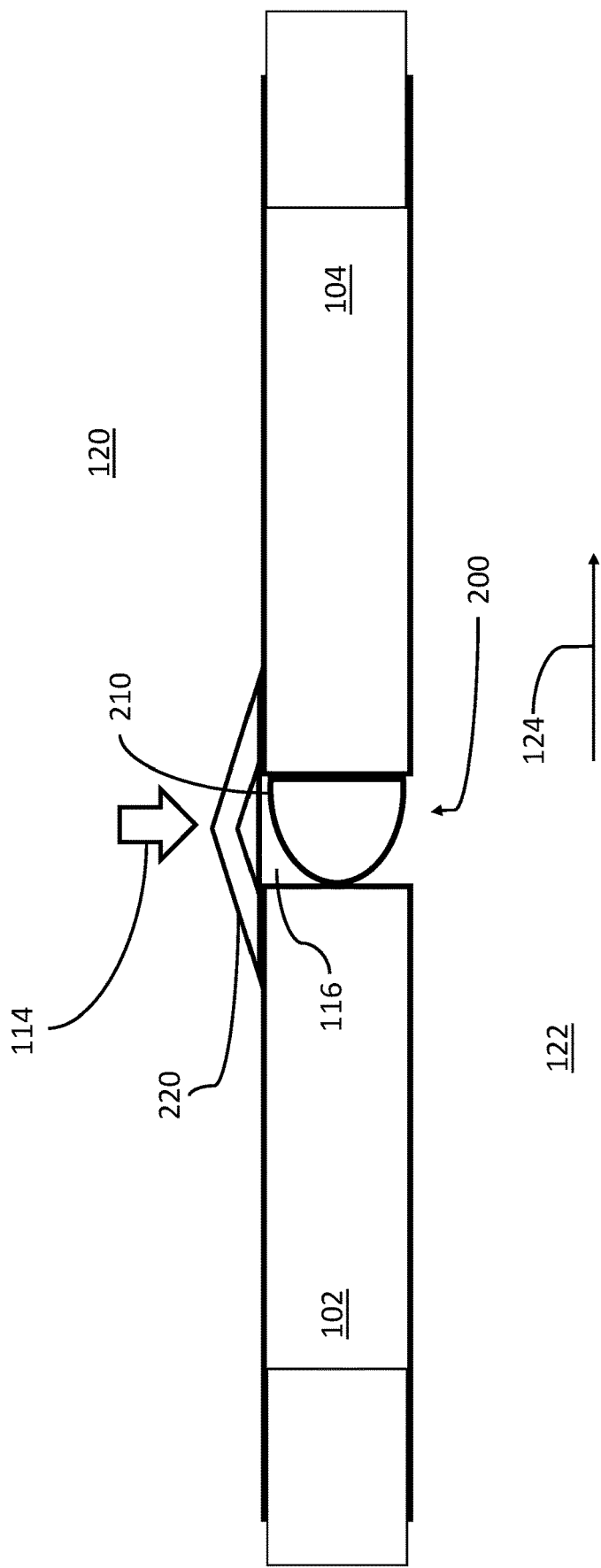
FIG. 7 is a sectional view of a third embodiment of a seal arrangement according to the present disclosure.

FIG. 6 shows an alternative embodiment to FIG. 5, in that in FIG. 6 the first flame deflector 220 has a convex polygonal external shape, i.e. a polygonal shape in which none of the internal angles of the external surface are greater than 180 degrees. It will be understood that the term convex external shape is taken to include convex external curved shapes and convex external polygonal shapes within the context of the present disclosure, i.e. shapes which provide no recesses in which flammable fluid might collect. To illustrate this point, FIG. 7 shows another alternative shape for the first flame deflector 220. Whilst the internal surface (i.e. the surface of the first flame deflector closest to the pressure boundary seal 210) includes an internal angle greater than 180 degrees, this does not affect the first flame deflector's ability to prevent pooling around the pressure boundary seal, as the external surface of the first flame deflector is convex (i.e. the external surface has no indentations, and there are no internal angles of the external surface greater than 180 degrees). It is to be understood that such alternative external shapes can be applied to any of the seal embodiments shown in the following figures describing embodiments of the present disclosure, as they all share the necessary properties required to realise the advantageous concept of the present disclosure.

Figure 8:
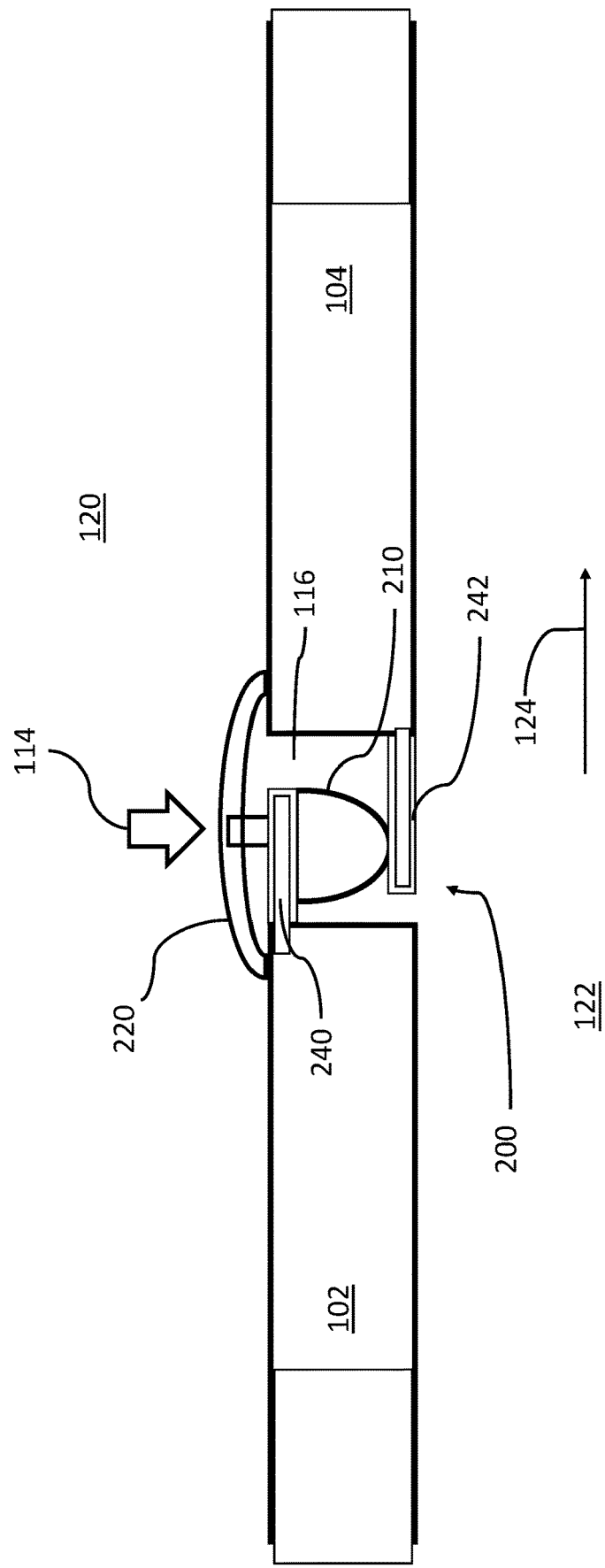
FIG. 8 is a sectional view of a fourth embodiment of a seal arrangement according to the present disclosure.

FIG. 8 shows a further alternative embodiment of the present disclosure. In FIG. 8, the first component 102 has a first component lip 240 and the second component 104 has a second component lip 242, the lips 240, 242 of the first and second components at least partially overlapping in the region of the pressure boundary seal 210 so as to create a labyrinthine pathway between the two components 102, 104. In this configuration, the pressure boundary seal 210 is attached to one of the two lips (in FIG. 8 it is shown fixed to the lip 240 of the first component 102, but the skilled person will appreciate the pressure boundary seal could just as easily be rotated so as to be fixed to the lip 242 of the second component 104), and forms the seal by pressing against the lip of the component opposite. As with the embodiments shown in FIGS. 5, 6, and 7, the first flame deflector 220 is positioned on the same side of the first 102 and second 104 components as the potential source of flames 114. As with the embodiments shown in FIGS. 5, 6, and 7, the first flame deflector 220 covers the gap where the pressure boundary seal is situated, i.e. the labyrinthine pathway between the first component and the second component. Whilst shown in FIG. 8 as having the same configuration as that shown in FIG. 5, it will be appreciated that the first flame deflector 220 could alternatively have any suitable convex shape, examples of which being the configurations shown in FIG. 6 or 7.

Figure 9:
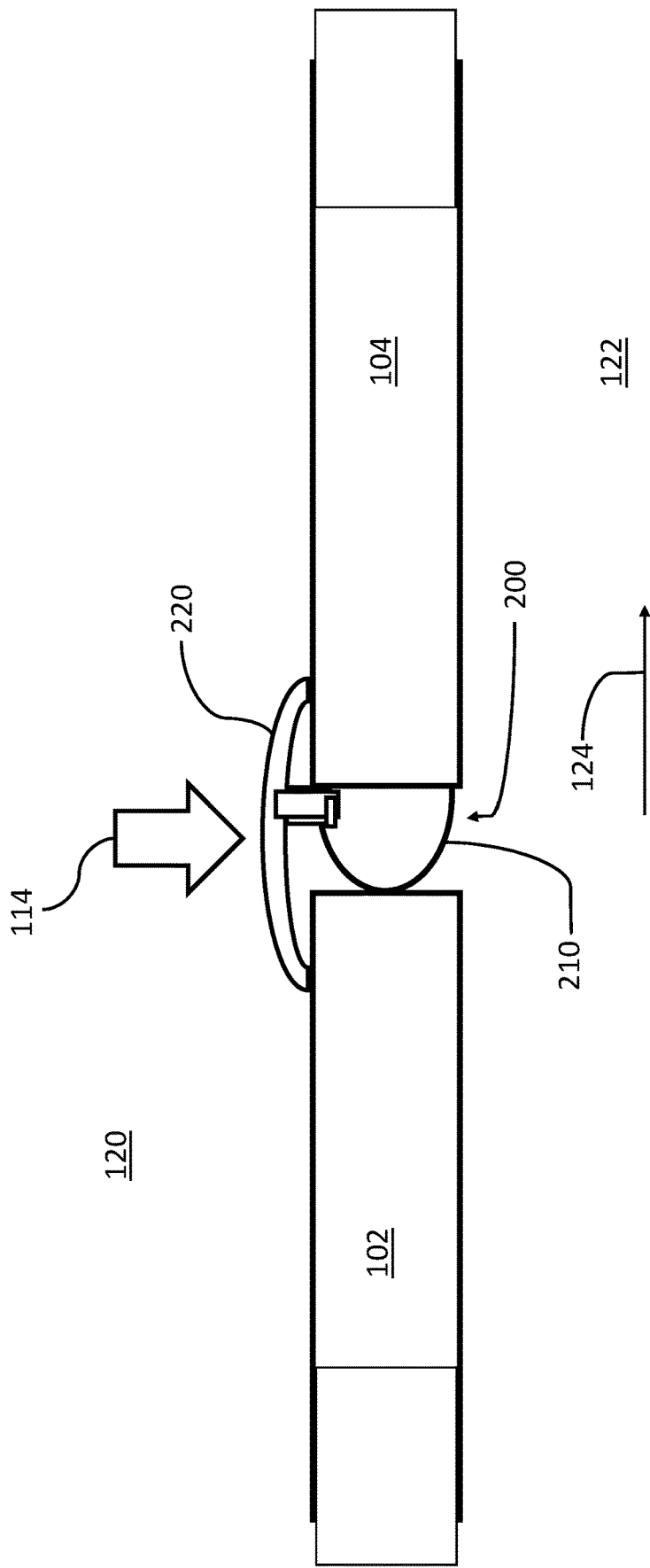
FIG. 9 is a sectional view of a fifth embodiment of a seal arrangement according to the present disclosure.

FIG. 9 shows a further alternative embodiment, where the pressure boundary seal 210 and the first flame deflector 220 are attached to form a single piece seal. As with the embodiments shown in FIGS. 5, 6, and 7, the first flame deflector 220 covers the gap where the pressure boundary seal is situated. Such a design has the advantage of being faster to install than the embodiments of FIGS. 5, 6, 7, and 8. In the embodiment of FIG. 9, it is an option to have the first flame deflector 220 part of the seal arrangement 200 not fixed directly to either of the first component 102 or the second component 104, so that it creates a slidable seal with both the first component 102 and the second component 104. Alternatively, the first flame deflector 220 may be fixed to the same component as the pressure boundary seal (in this example, the second component 104), and create a sliding seal with the other component (in this example, the first component 102).

Figure 10:
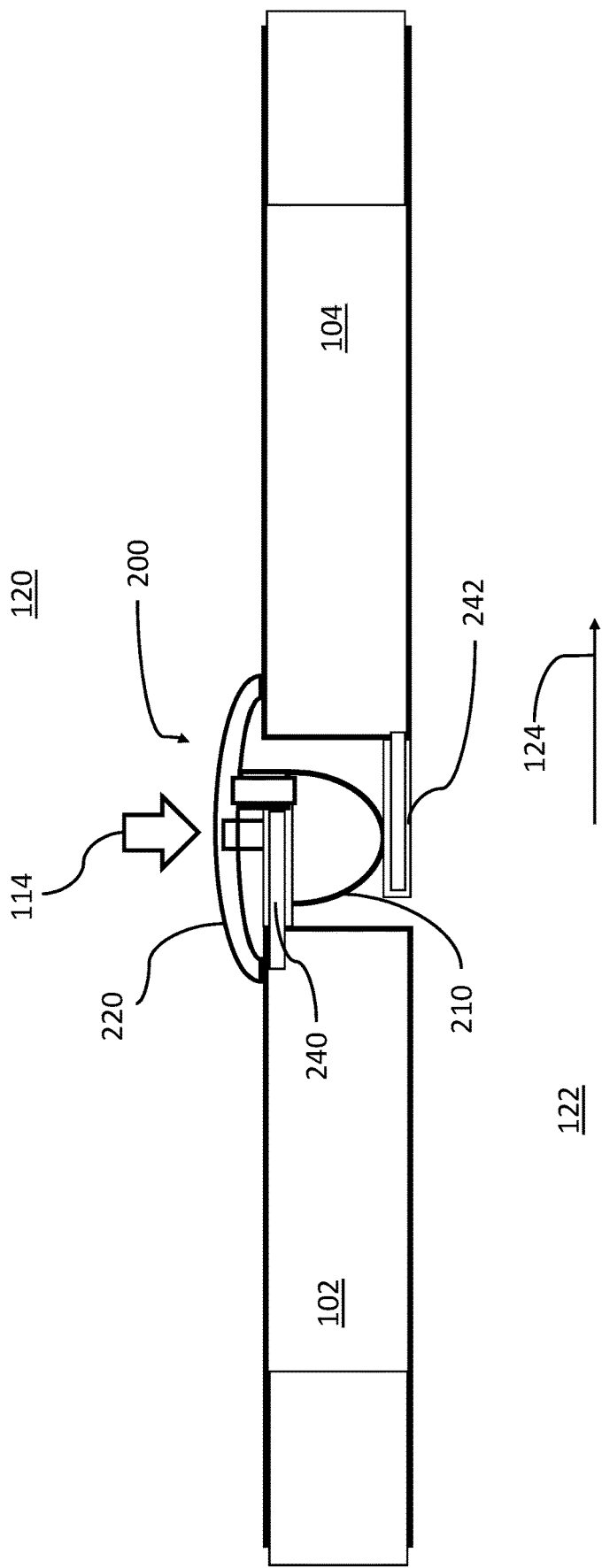
FIG. 10 is a sectional view of a sixth embodiment of a seal arrangement according to the present disclosure.

FIG. 10 shows an alternative embodiment to FIG. 9, in that, whilst the pressure boundary seal 210 and the first flame deflector 220 are still attached to form a single piece seal, the combination has been modified for an arrangement where the first 102 and second 104 components have lips 240, 242 running along an edge of each component, as with the embodiment shown in FIG. 8. As with the embodiment of FIG. 8, the first and second component lips 240, 242 form a labyrinthine passage between the components 102, 104, and the pressure boundary seal 210 is rotated 90 degrees so as to be affixed to one of the lips (in FIG. 10, the pressure boundary seal 210 is fixed to the lip 240 of the first component 102, but the skilled person will appreciate it could just as easily be affixed to the lip 242 of the second component, with a join extending from the surface of the pressure boundary seal 210 to the first flame deflector 220), so as to provide a boundary between a lip 240 of the first component 102 and the lip 242 of the second component 104. As with the embodiment shown in FIG. 8, the first flame deflector 220 covers the gap where the pressure boundary seal is situated, i.e. the labyrinthine pathway between the first component and the second component.

Figure 11:
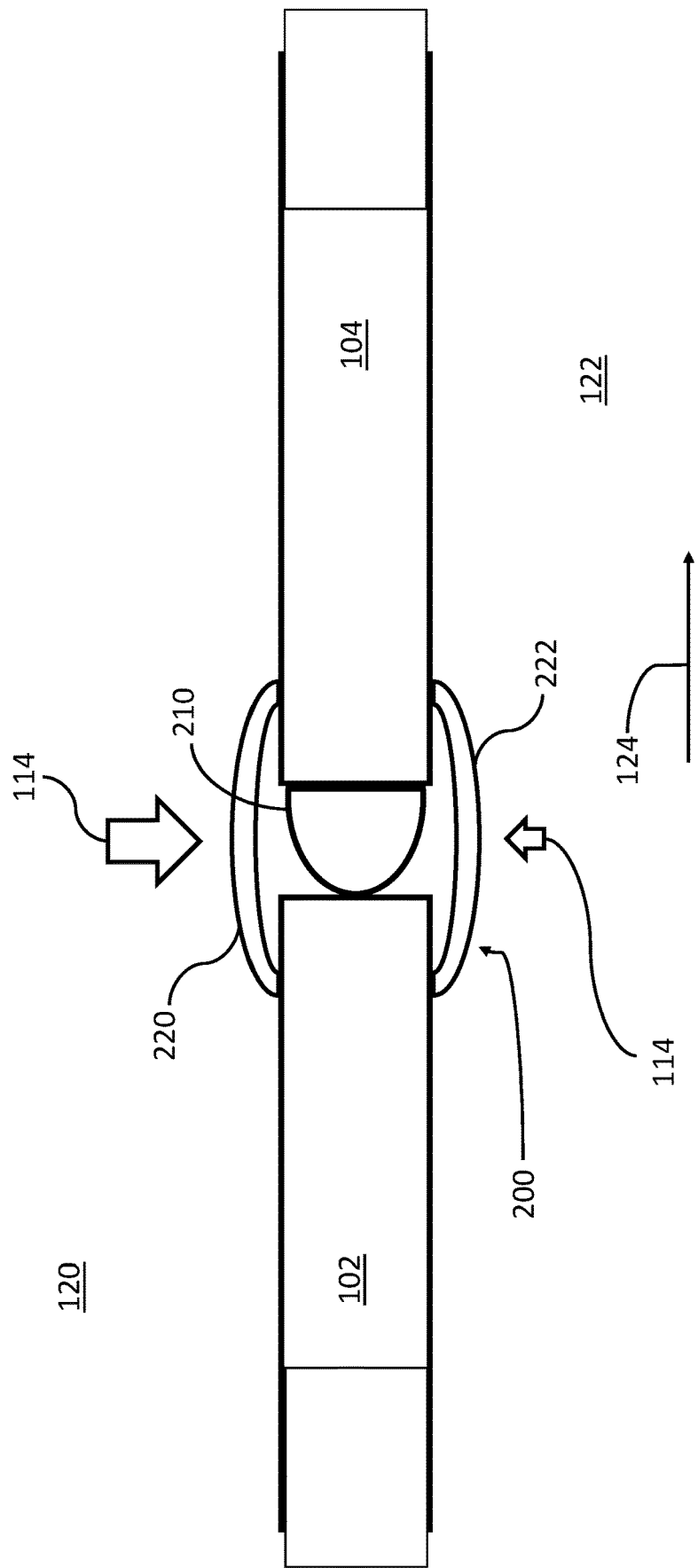
FIG. 11 is a sectional view of a seventh embodiment of a seal arrangement according to the present disclosure.

FIG. 11 shows a seventh embodiment of the present disclosure. This embodiment is particularly useful for sealing the boundary formed by two components between two interior regions (i.e. a boundary between two adjoining or neighbouring regions from which flames and or flammable liquid may impinge upon the seal from either side, or both sides, of the seal). In this example, the pressure boundary seal 210 is present between the first 102 and second 104 components as before, but now in addition to the first flame deflector 220 on one side of the pressure boundary seal 210, there is a second flame deflector 222 on the other side of the pressure boundary seal 210. As with, for example, FIG. 5, it is preferred that each of the flame deflectors 220,222 is attached to just one of the first 102 or second 104 components, and creates a sliding seal with the other component. The flame deflectors 220,222 do not have to both be attached to the same component, and can instead have the first flame deflector 220 fixed to the first component 102 and the second flame deflector 222 attached to the second component 104, each creating a sliding seal with the other component that they are not attached to.

It will be understood that the second flame deflector 222 of the present disclosure, just as with the first flame deflector 220, is configured to bridge across and cover the gap where the pressure boundary seal is situated, i.e. the gap between the first component and the second component, forming a fluid-tight seal with the first 102 and second 104 components it is in contact with. The second flame deflector 222 therefore provides the same two useful advantages: that by covering the pressure boundary seal, the flame deflector deflects flames away from the pressure boundary seal, increasing the amount of time the seal can prevent flames reaching beyond the confines of the region or air reaching the source of the flames, and that it prevents fluids from pooling around the seal in the gap between the first 102 and second 104 components by having an external (i.e. the surface of the second flame deflector furthest from the pressure boundary seal) convex curve shape. Just as with the first flame deflector 220, it is to be understood that the second flame deflector 222 such as that shown in the examples of FIGS. 11, 12, 13 and 14, may also have any of a range of alternative external shapes such as those shown in the figures describing embodiments of the present disclosure, or shapes having the properties described in the disclosure, as they all share the necessary features required to realise the advantageous concept of the present disclosure.

Figure 12:
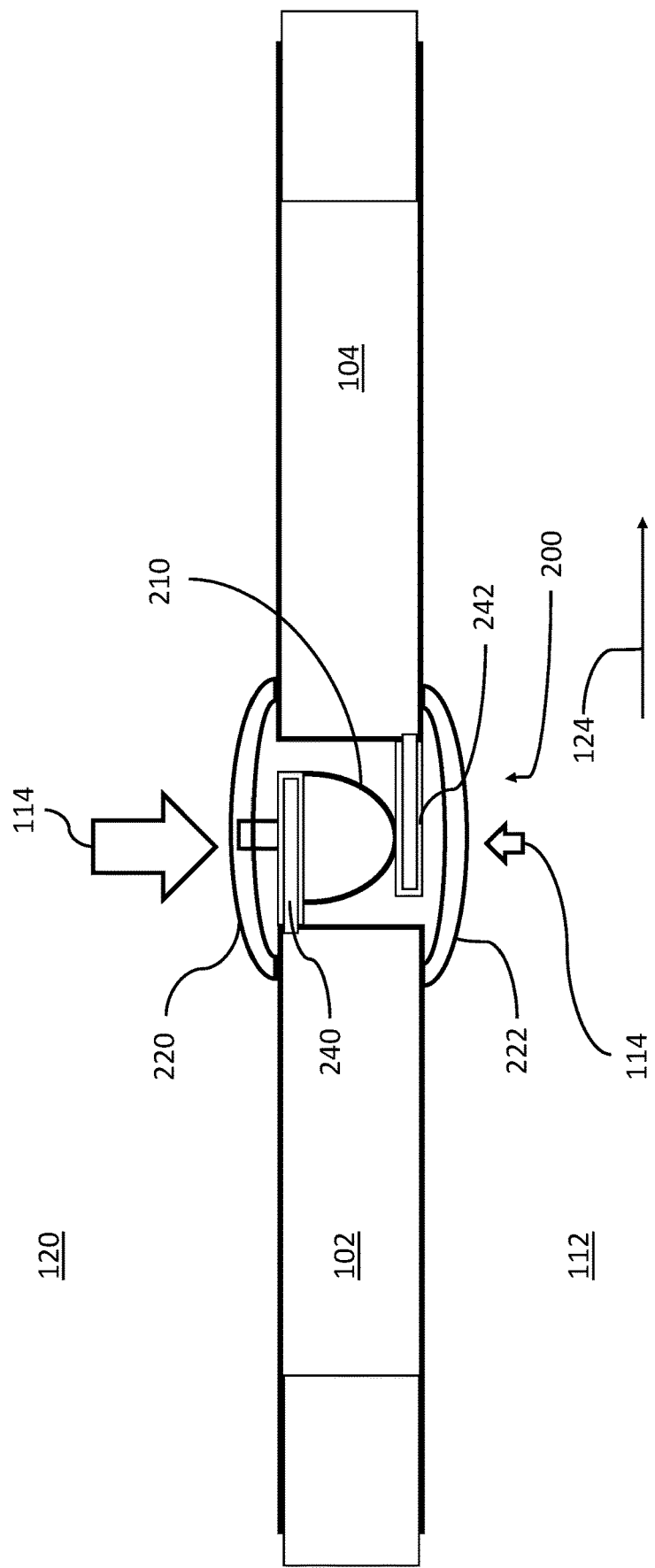
FIG. 12 is a sectional view of an eighth embodiment of a seal arrangement according to the present disclosure.
Figure 13:
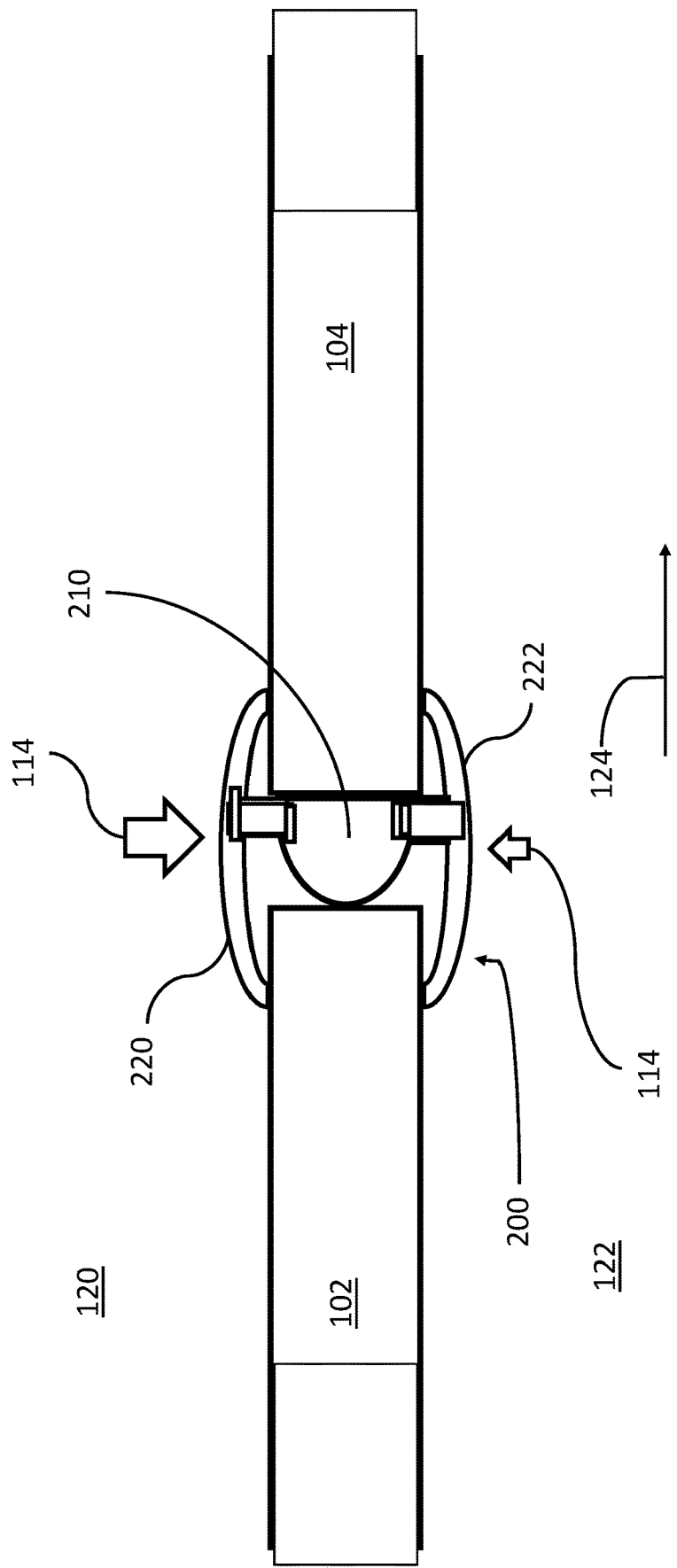
FIG. 13 is a sectional view of a ninth embodiment of a seal arrangement according to the present disclosure.
Figure 14:
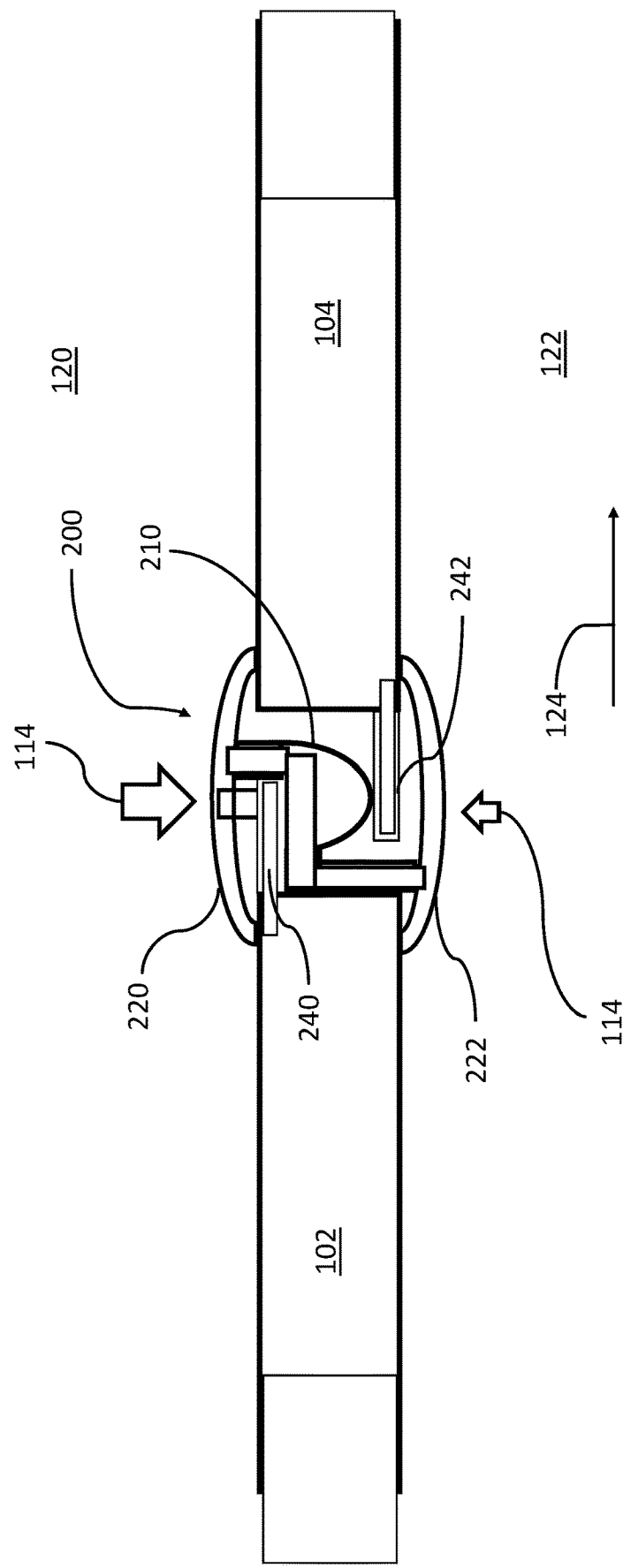
FIG. 14 is a sectional view of a tenth embodiment of a seal arrangement according to the present disclosure.

FIGS. 12, 13 and 14 show alternative embodiments to that of FIG. 11. FIG. 12 is suitable for the situation where the first 102 and second 104 components have lips 240, 242 running along an edge of each component, as with the embodiment shown in FIG. 8. The pressure boundary seal is situated in the labyrinthine passage between the first and second components, sealing the gap between the first component lip 240 and the second component lip 242.

FIG. 13 shows a ninth embodiment of the present disclosure. In this example, there are flame deflectors 220 on both sides of the pressure boundary seal 210, each straddling the gap between the first 102 and second 104 components on a different side of the pressure boundary seal 210. Both flame deflectors 220 are attached to, and cover, the pressure boundary seal 210 so as to form a single piece. As with the seal arrangement of the fifth embodiment shown in FIG. 9, it is an option to have the flame deflectors 220, 222 of the seal arrangement 200 not fixed to either of the first component 102 or the second component 104, but rather fixed just to the pressure boundary seal 210 such that they create a slidable seal with both the first component 102 and the second component 104. Alternatively, they may be fixed to the same component as the pressure boundary seal (in this example, the second component 104), and create a sliding seal with the other component (in this example, the first component 102).

FIG. 14 shows an embodiment combining a pressure boundary seal 210 arranged for the situation where the first 102 and second 104 components have lips 240, 242 running along an edge of each component, as with the embodiments shown in FIGS. 8 and 12. The pressure boundary seal is situated in the labyrinthine passage between the first and second components, sealing the gap between the first component lip 240 and the second component lip 242. In this embodiment, as with the embodiment shown in FIG. 13, there are flame deflectors on both sides of the pressure boundary seal 210, each straddling the gap between the first 102 and second 104 components on a different side of the pressure boundary seal 210, so as to cover the gap where the pressure boundary seal is situated. Both flame deflectors 220 are attached to the pressure boundary seal 210 so as to form a single piece. As with the seal arrangements of FIGS. 11 and 12, it is preferred that the flame deflectors 220 of the seal arrangement 200 are not fixed to either of the first component 102 or the second component 104, but rather that they create a slidable seal with both the first component 102 and the second component 104. Alternatively, they may be fixed to the same component as the pressure boundary seal (in this example, the second component 104), and create a sliding seal with the other component (in this example, the first component 102).

It will be appreciated that in embodiments such as those shown in FIGS. 11, 12, 13 and 14 where the seal arrangement 200 comprises first 220 and second 222 flame deflectors, one of the first or second flame deflectors can be attached to the pressure boundary seal 210, and the other of the first or second flame deflectors can instead be attached to the first 102 or second 104 component, as with the examples shown in FIGS. 5, 6, 7, and 8.

Figure 15:
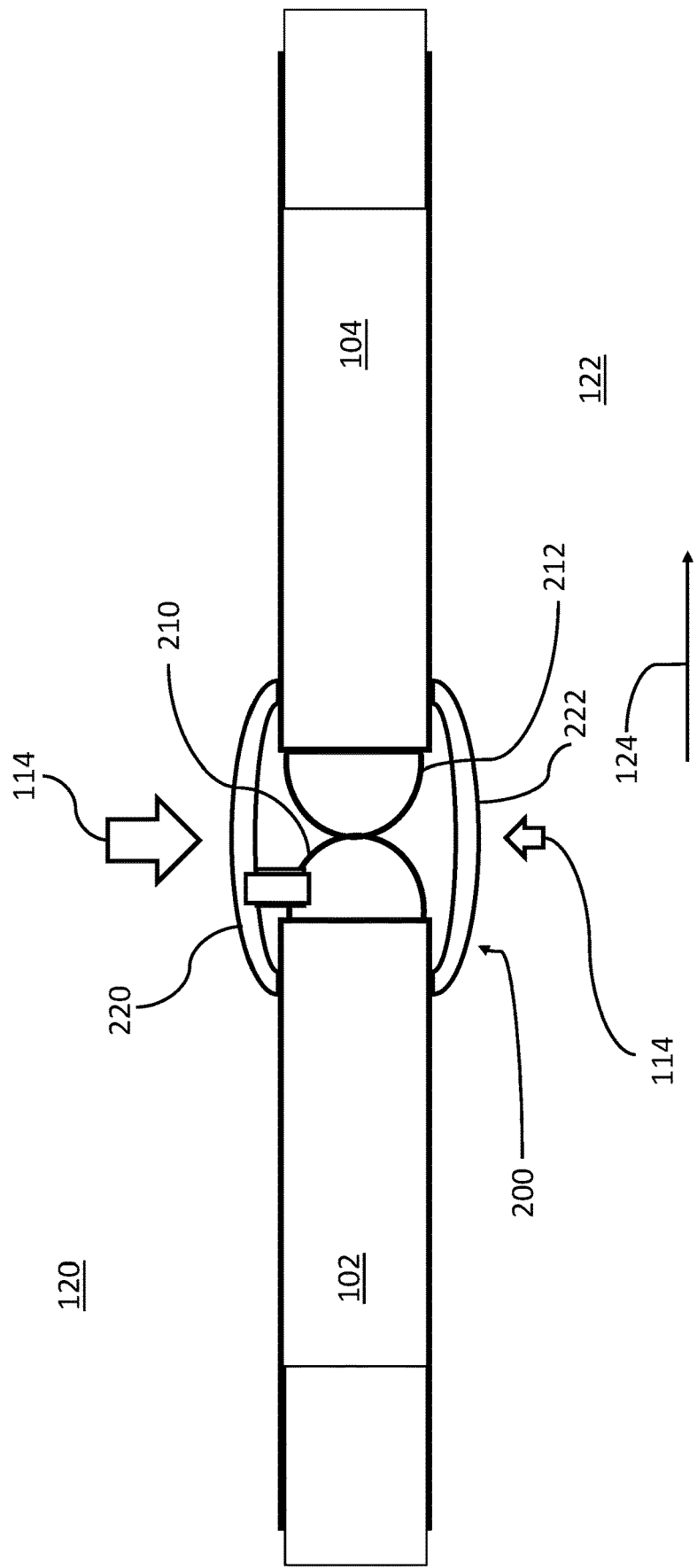
FIG. 15 is a sectional view of an eleventh embodiment of a seal arrangement according to the present disclosure.

FIG. 15 shows an eleventh embodiment of the present disclosure, wherein the seal arrangement 200 comprises first 210 and second 212 pressure boundary seals, the first pressure boundary seal 210 being affixed to the first component 102, and the second pressure boundary seal 212 being affixed to the second component 104, although it will be appreciated that the first and second pressure boundary seals can be swapped between the first and second components without affecting the operation of the seal arrangement. The first 210 and second 212 pressure boundary seals face each other such that when the seal arrangement 200 is compressed between the first 102 and second 104 components, the first 210 and second 212 pressure boundary seals are compressed together to form a fluid and air-tight seal between them. In the example shown in FIG. 15, the first flame deflector 220 is attached to the first pressure boundary seal 210 so as to form a single piece, whilst the second flame deflector 222 is separate from both the first 210 and second 212 pressure boundary seals. It will be appreciated however, that any combination of attachment between the first and second flame deflectors and the first and second pressure boundary seals, including no attachment at all, is possible within the bounds of the disclosure without affecting the ability of the seal arrangement to function. For example, both the first and second flame deflectors may be attached to the same one of the first or second pressure boundary seals; each pressure boundary seal may have one of the first or second flame deflectors attached to it; one of the first and second flame deflectors may be attached to the first or second component only, with the other of the first and second flame deflectors being attached to the other component; or one or both of the first and second flame deflectors may be attached to both one of the first or second pressure boundary seals and the first or second component that the pressure boundary seal it is attached to is also attached. However, it is common to each variation that both the first and second flame deflectors cover the gap where the first and second pressure boundary seals are situated, so that in the event of a fire, flames are deflected away from the pressure boundary seal.

Equally, it will be appreciated that the combination of first 210 and second 212 pressure boundary seals can be used in the situation where only one flame deflector is present, such as in the examples shown in FIGS. 5 to 10.

Figure 16:
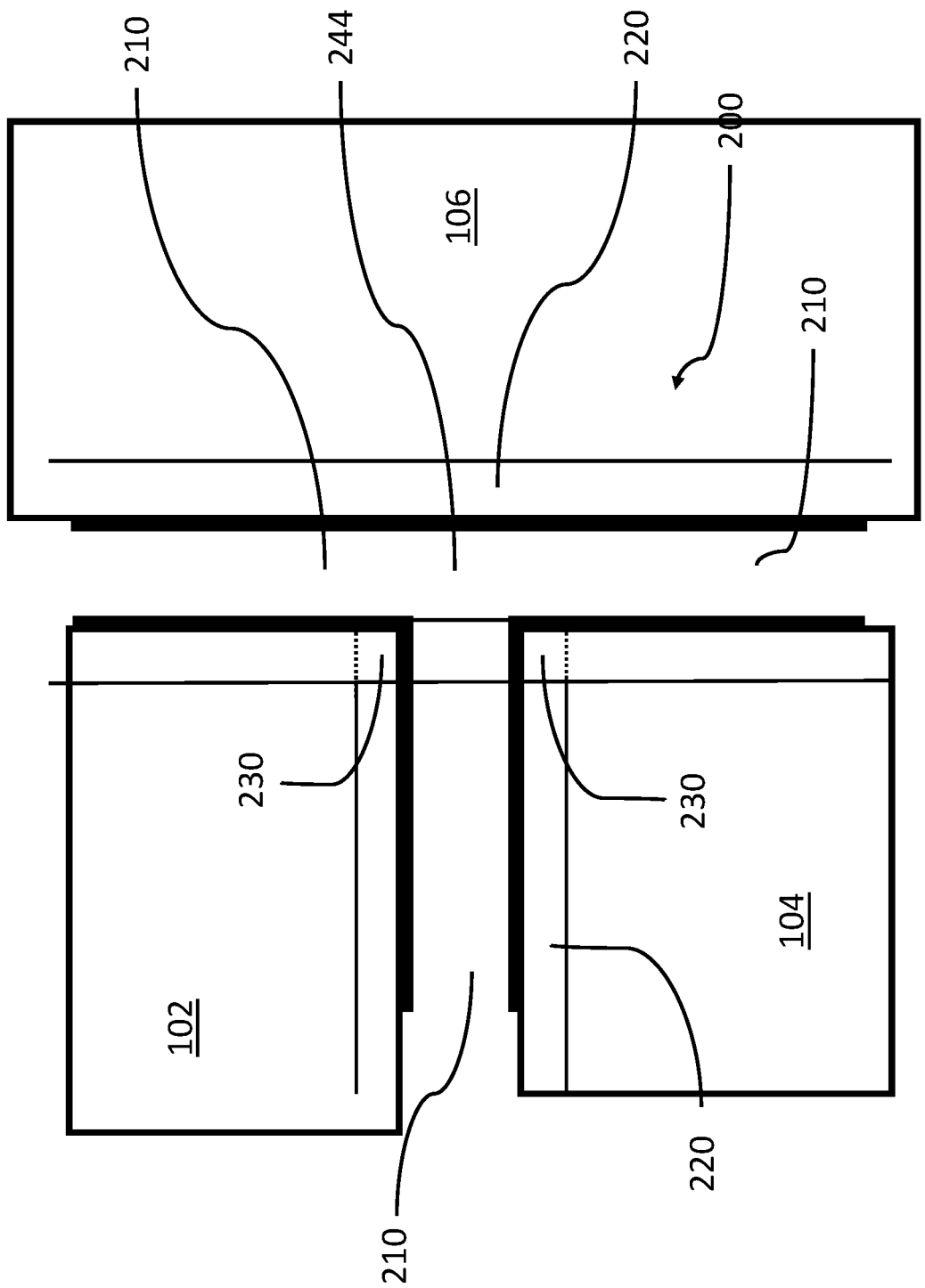
FIG. 16 is a plan view of a twelfth embodiment of a seal arrangement according to the present disclosure.

FIG. 16 shows a twelfth embodiment of the present disclosure in plan view, for the situation where a first 102, second 104 and third 106 components meet, effectively creating a "T-junction" 244 between them which requires sealing. Away from the T-junction region, the boundaries between the components can be sealed according to any of the previously described embodiments, depending on the nature of the regions (i.e. interior or exterior) on either side of the components 102, 104, 106. In the zones 230 where the flame deflectors 220 meet each other, an overlap zone is created. It is preferred that in these regions both flame deflectors persist so as to create a seal which is overlapped by two flame deflectors, rather than merging the two into a single T-shaped deflector, although this is also possible. Keeping the seals separate, but overlapping, is preferred because creating a good pressure seal at these T-junctions is more challenging than between just two components. By having a double layering of the flame deflector 220, the performance of the seal in these regions is improved.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A seal arrangement for a gas turbine engine, the seal arrangement being configured to provide an airtight and fluid-tight seal between a first component and a second component, the seal arrangement comprising:
   a first pressure boundary seal disposable at least partially within the gap between the first component and the second component, the first pressure boundary seal being fixable to one of the first or second components so as to create an airtight seal with the other of the first or second component; and
   a first flame deflector configured to bridge across and cover the gap between the first component and the second component so as to create a fluid-tight seal over the gap between the first component and the second component;
   wherein the first flame deflector has a convex external shape extending from the first component to the second component so as to prevent any fluid impinging upon the first flame deflector from pooling on the first pressure boundary seal.

2. The seal arrangement of claim 1, wherein the seal arrangement further comprises a second pressure boundary seal, the second pressure boundary seal being disposable at least partially within the gap between the first component and the second component, the second pressure boundary seal being fixable to the first or second component opposite the first pressure boundary seal, so as to create an airtight seal between the first component and the second component with the first pressure boundary seal when in use.

3. The seal arrangement of claim 1, wherein the first flame deflector is fixed to one or other of the first component or the second component.

4. The seal arrangement of claim 1, wherein the first flame deflector is attached to the first pressure boundary seal.

5. The seal arrangement of claim 1, wherein the first flame deflector has a convex external curved shape.

6. The seal arrangement of claim 1, wherein the first flame deflector has a convex external polygonal shape.

7. The seal arrangement of claim 1, the seal arrangement further comprising a second flame deflector, the second flame deflector configured to bridge across and cover the gap between the first component and the second component so as to create a fluid-tight seal over the gap between the first component and the second component and encapsulate the first pressure boundary seal.

8. The seal arrangement of claim 7, wherein the second flame deflector is fixed to one or other of the first component or the second component.

9. The seal arrangement of claim 7, wherein the second flame deflector is attached to the first pressure boundary seal or the second pressure boundary seal.

10. The seal arrangement of claim 7, wherein the second flame deflector has a convex external curved shape.

11. The seal arrangement of claim 7, wherein the first flame deflector has a convex external polygonal shape.

12. A gas turbine engine for an aircraft, the gas turbine engine including a seal arrangement according to claim 1.

* * * * *